United States Patent [19]

Toyota et al.

[11] 4,076,924

[45] Feb. 28, 1978

[54] PROCESS FOR POLYMERIZATION OR COPOLYMERIZING OLEFINS CONTAINING AT LEAST 3 CARBON ATOMS

[75] Inventors: Akinori Toyota, Iwakuni; Kiyoshi Odawara, Waki; Norio Kashiwa, Iwakuni, all of Japan

[73] Assignee: Mitsui Petrochemical Industries Ltd., Tokyo, Japan

[21] Appl. No.: 608,278

[22] Filed: Aug. 27, 1975

[30] Foreign Application Priority Data

Sep. 3, 1974   Japan ................................. 49-100553
Jun. 25, 1975  Japan ................................. 50-77555

[51] Int. Cl.$^2$ .......................... C08F 4/02; C08F 10/06
[52] U.S. Cl. ................................. 526/125; 252/429 B; 252/429 C; 526/351
[58] Field of Search ........................... 526/125, 142; 252/429 B, 429 C

[56] References Cited

U.S. PATENT DOCUMENTS 3,642,746   2/1972   Kashiwa et al. ..................... 526/125

FOREIGN PATENT DOCUMENTS 2,346,471   4/1974   Germany.
2,230,672  12/1972   Germany.

*Primary Examiner*—Edward J. Smith
*Attorney, Agent, or Firm*—Sherman & Shalloway

[57] ABSTRACT

A process for preparing a highly stereoregular olefin polymer or copolymer in high yield and with good reproducibility of quality and yield, which comprises polymerizing or copolymerizing an olefin containing at least 3 carbon atoms in the presence of a catalyst comprising (a) a solid titanium catalyst component obtained by reacting a solid magnesium component with a titanium compound in the absence of a free organometallic compound of a metal of Groups I to III of the periodic table and separating the solid component of the resulting reaction product, said magnesium component being obtained by separating a solid from a suspension of a reaction product derived from (i) a magnesium dihalide, (ii) an active hydrogen-containing organic compound, (iii) an organic acid ester and (iv) an organometallic compound of a metal of Groups I to III of the periodic table, and (b) an organometallic compound of a metal of Groups I to III of the periodic table.

25 Claims, No Drawings

PROCESS FOR POLYMERIZATION OR COPOLYMERIZING OLEFINS CONTAINING AT LEAST 3 CARBON ATOMS

This invention relates to a process for preparing a highly stereoregular polymer or copolymer of an olefin containing at least 3 carbon atoms in high yields and with good reproducibility of quality and yield.

Catalyst systems comprising solid titanium halides and organoaluminum compounds have previously gained widespread acceptance for use in preparing highly stereoregular polymers of α-olefins. With these catalyst systems, highly stereoregular polymers can be obtained, but the yield of the polymer per unit amount of the titanium catalyst is still at a low level. Hence, the polymerization process requires a step of removing the catalyst residue in the resulting polymer. U.S. Pat. No. 3,642,746 (corresponding to British Pat. No. 1,271,411) discloses a method whereby the catalyst residue can be reduced by using a highly active catalyst to such an extent that the removal of it is not necessary. In this method, the transition metal component of the catalyst is obtained by pre-treating particles of a carrier with an electron-donor, heat-treating them together with a transition metal halide which is liquid under the treating conditions to fix the transition metal halide to the surface of the particles. The catalyst used in this method shows better results than catalysts prepared by using a carrier not treated with an electron-donor, but is still desired to be improved. With a view to improving this catalyst, a method was suggested in which to use a transition metal catalyst component derived from a titanium compound and a magnesium halide carrier obtained by treating a magnesium halide with an electron donor and treating the treated product further with an organic metal compound of a metal of Groups I to III of the periodic table (Japanese Laid-Open Patent Application No. 51378/74, German OLS 2,346,471).

In this suggestion, no description is made as to the use of two electron donors in combination. In particular, this citation fails to disclose the conjoint use of an active hydrogen-containing organic compound such as an alcohol and an organic acid ester. Furthermore, in this suggestion, the catalyst is recommended for polymerization or copolymerization or ethylene or ethylene with other olefins and/or dienes. Even when the catalyst suggested there is used for the polymerization of olefins having at least 3 carbon atoms such as propylene, polyolefins of high stereoregularity are difficult to prepare in high yields as will be shown later on by a comparative example.

Another known catalyst comprises a transition metal catalyst component obtained by reacting an active magnesium halide and a titanium compound in the presence, if desired, of a donor selected from esters of oxygen-containing organic acids and inorganic acids, a trialkyl aluminum and the above ester (Japanese Laid-Open Patent Application No. 16986/73. corresponding to German OLS 2,230,672, and French Pat. No. 2,143,346). This reference neither describes the conjoint use of two electron donors or the use of a carrier obtained by reacting with an organometallic compound of a metal of Groups I to III of the periodic table. Even when the catalyst suggested there is used for the polymerization of olefins containing at least 3 carbon atoms, for example, propylene, highly stereoregular polyolefins are difficult to obtain in high yields.

German OLS 2,461,677 laid open after the priority date of the present application discloses the use of a transition metal catalyst component obtained by reacting a carrier component derived from a magnesium halide, an alcohol, a donor other than the alcohol and an organometallic compound of a metal of Groups I to III of the periodic table, with a titanium compound in the presence of the organometallic compound of a metal of Groups I to III of the periodic table. In this prior attempt, the above transition metal component is further combined with an organometallic compound of a metal of Groups I to III of the periodic table to form a catalyst. The catalyst is recommended for use in polymerization or copolymerization of ethylene, or ethylene with other olefins and/or dienes, and no example is shown about the homopolymerization of an olefin containing at least 3 carbon atoms, e.g., propylene or the preparation of a copolymer consisting mainly of propylene units. Certainly, this catalyst exhibits a superior activity in the polymerization of ethylene or the copolymerization of a monomeric mixture consisting mainly of ethylene. However, it is unsuitable for the production of highly stereoregular polymers or copolymers of olefins containing at least 3 carbon atoms in high yields.

We have made extensive investigations in an attempt to provide a process for preparing polymers of copolymers of olefins containing at least 3 carbon atoms with good reproducibility of quality and yield, which provides high stereoregularity and high yield not attainable simultaneously by any of the abovementioned prior attempts. As a result, we found that a catalyst comprising (1) a transition metal catalyst component prepared by reacting (a) a solid magnesium component obtained by separating a solid from a suspension of a reaction product derived from two types of donor, especially an active hydrogen-containing organic compound such as an alcohol and an organic acid ester, a magnesium dihalide and an organometallic compound of a metal of Groups I to III of the periodic table with (b) a titanium compound in the absence of a free organometallic compound of a metal of Groups I to III of the periodic table, and separating the solid in the resulting reaction product, and (2) an organometallic compound of a metal of Groups I to III of the periodic table affords both high stereoregularity and high yield and exhibits superior reproducibility of quality and yield.

Accordingly, it is an object of this invention to provide a process for preparing a highly stereoregular polymer or a copolymer of an olefin containing at least 3 carbon atoms in high yields and with good reproducibility of quality and yield, in which an operation of removing the catalyst remaining in the resulting polymer or copolymer can be omitted.

Many other objects and advantages of this invention will become apparent from the following description.

The catalyst used in the process of this invention comprises a combination of:
(a) a solid titanium catalyst component prepared by reacting (1) a solid magnesium component obtained by separating the solid from a suspension of a reaction product derived from (i) a magnesium halide, (ii) an active hydrogen-containing organic compound, (iii) an organic acid ester and (iv) an organometallic compound of a metal of Groups I to III of the periodic table with (2) a titanium compound in the absence of a free organometallic compound of a metal of Groups I to III of the periodic table, and separating the solid component from the resulting reaction product, and (b) an organometallic compound of a metal of Groups I to III of the periodic table.

The molar ratio of the (i) magnesium dihalide, (ii) active hydrogen-containing organic compound, (iii) organic acid ester, (iv) organometallic compound of a metal of Groups I to III of the periodic table and (2) titanium compound (i:ii:iii:iv:2) is preferably 1:20-0.1:20-0.005:20-0.1: at least 0.01, more preferably 1:6-0.1:3-0.1:6-0.2:100-0.1.

The solid titanium catalyst component is prepared by washing the solid magnesium component obtained by separating the solid component from a suspension of a reaction product obtained by reacting the above four components (i) to (iv), with, for example, an inert solvent to remove the free organometallic compound (iv), and reacting the magnesium component in the absence of the free organometallic compound (iv), and separating the solid in the resulting reaction product.

In the preparation of the reaction product of the four components (i) to (iv), the sequence of adding these components or the manner of adding them can be suitably changed. For example, the four components can be added at a time, or two or more of these components are first reacted, and then the remaining components are added. Or one component can be added in portions. In a preferred embodiment, the magnesium dihalide (i) is reacted with the active hydrogen-containing organic compound (ii) and the organic acid ester (iii) either together or first with one of them and then with the other, and then the reaction product is reacted with the organometallic compound (iv). In another preferred embodiment of this invention, the magnesium dihalide (i) is reacted with the active hydrogen-containing compound (ii), and then the reaction product is reacted with the organometallic compound (iv), followed by reacting the reaction product with the organic acid ester (iii). For example, in accordance with these preferred embodiments, the solid titanium catalyst component (a) can be prepared as follows:

(1) The magnesium dihalide (i) is pre-treated with the active hydrogen-containing compound (ii) and the organic acid ester (iii), and then reacted with the organometallic compound (iv). The solid reaction product separated from the resulting suspension of the reaction product is washed with an inert solvent and treated by suspending it in the titanium compound (2) or its solution in an inert solvent in the absence of the free organometallic compound of a metal of Groups I to III of the periodic table, and the solid component is separated and recovered.

(2) The magnesium dihalide (i) is pre-treated with the active hydrogen compound (ii), and the pre-treated product is reacted with the organometallic compound (iv). The resulting reaction product is treated with the organic acid ester (iii). The solid reaction product separated from the resulting suspension of the reaction product is washed with an inert solvent, and in the absence of the free organometallic compound of a metal of Groups I to III of the periodic table, treated by suspending it in the titanium compound (2) or its solution in an inert solvent, and the solid component is separated and recovered.

(3) The magnesium dihalide (i) is pre-treated with the organic acid ester (iii), and the pre-treated product is further treated with the active hydrogen-containing compound (ii). The treated product is reacted with the organic metal compound (iv). The solid reaction product separated from the suspension of the reaction product is washed with an inert solvent, and in the presence of the free organic metal compound of a metal of Groups I to III of the periodic table, treated by suspending it in the titanium compound (2) or its solution in an inert solvent, and the solid component is separated and recovered.

In the pre-treating operation of forming the four-component reaction product, various methods of contacting can be used as means of pre-treating the magnesium halide with a compound selected from the active hydrogen-containing compounds, organic acid esters and organic metal compounds. Preferably, the magnesium halide is suspended in an inert hydrocarbon such as hexane, and the active hydrogen-containing compound is added. The mixture is stirred, and then reacted with the organic acid ester and the organometallic compound, if desired, in the form of a solution in an inert solvent, in the sequence shown in (1) and (2) above. The reaction of forming the four-component reaction product can be performd at room temperature, but generally, it is preferred to carry it out at an elevated temperature. The upper limit of the treating temperature is preferably below the boiling points or decomposition points at atmospheric pressure of the active hydrogen-containing compounds, organic acid esters and organic metal compounds used to form the above suspension. The upper limit can of course be elevated by using elevated pressures.

The suspension of the four-component reaction product may contain unreacted components. Accordingly, the solid component is separated and washed with an inert solvent such as hexane, heptane or kerosene to form the solid magnesium component. The resulting solid magnesium component is reacted with the titanium compound (2) in the absence of a free organometallic compound of a metal of Groups I to III of the periodic table. This reaction (supporting reaction) can be performed by contacting the solid magnesium component with the titanium compound preferably in the presence of an inert solvent such as hexane, heptane, kerosene, benzene or toluene at room temperature to 200° C. for 10 minutes to 5 hours. When the titanium compound is liquid, the use of the inert solvent can be omitted. Then, the unreacted titanium compound is removed by filtration or decantation, and the solid component is separated and recovered. The solid component is washed with a suitable inert solvent such as those exemplified above so that the unsupported titanium compound is removed as much as possible.

In the above-described manner, the solid titanium catalyst component (a) can be obtained.

The compounds (i) to (iv) and (2) used to form the solid titanium catalyst component (a) can be exemplified as follows:

(i) Magnesium dihalide

Suitable magnesium dihalide are magnesium dichloride, magnesium dibromide, and magnesium diiodide. The magnesium dichloride is especially preferred.

Desirably, the magnesium dihalide is as anhydrous as possible, but is permitted to have such a water content as does not substantially affect the efficiency of the catalyst. The magnesium dihalide may be one obtained by drying the commercially available species at reduced pressure at a temperature of about 100° to 400° C. prior to use. For the convenience of use, the magnesium halide is usually employed as a powder having an average particle diameter of about 1 to 50 microns, but particles of a larger particle size can also be used since a pulverizing action is exerted during the preparation of the catalyst. The average particle diameter of 1 to 50 microns means that at least 80% by weight of particles have a size of 1 to 50 microns.

(ii) Active hydrogen-containing organic compounds

Examples are alcohols, thiols, primary and secondary amines, aldehydes, organic acids, and amides and imides of the organic acids. Preferably, the active hydrogen-containing compounds are aliphatic or aromatic alcohols, for example, aliphatic alcohols containing 1 to 8 carbon atoms such as methanol, ethanol, n-propanol, n-butanol, i-pentanol, and 2-ethylhexanol, and aromatic alcohols containing 7 to 15 carbon atoms such as benzyl alcohol or phenetyl alcohol.

(iii) Organic acid esters

The organic acid esters may, for example, be primary alkyl esters of aliphatic monocarboxylic acids, alkyl esters of alicyclic carboxylic acids, and primary alkyl esters of aromatic monocarboxylic acids. Examples of preferred organic acid esters are alkyl esters formed between saturated or unsaturated aliphatic monocarboxylic acids containing 1 to 8 carbon atoms, preferably 1 to 4 carbon atoms and saturated or unsaturated aliphatic primary alcohols containing 1 to 8 carbon atoms, preferably 1 to 4 carbon atoms; alkyl esters formed between aromatic monocarboxylic acids containing 7 to 11 carbon atoms and saturated or unsaturated aliphatic primary alcohols containing 1 to 4 carbon atoms; and alkyl esters formed between alicyclic carboxylic acids containing 7 to 11 carbon atoms and saturated or unsaturated aliphatic primary alcohols containing 1 to 8, preferably 1 to 4 carbon atoms.

Of these, the primary alkyl esters of aliphatic monocarboxylic acids and the primary alkyl esters of aromatic monocarboxylic acids are especially preferred.

Specific examples include the following:

Primary alkyl esters of saturated aliphatic monocarboxylic acids such as methyl formate, ethyl acetate, n-amyl acetate, 2-ethylhexyl acetate, n-butyl formate, ethyl butyrate, and n-propyl valerate; esters formed from saturated aliphatic monocarboxylic acids and aromatic alcohols such as benzyl acetate or phenethyl acetate; primary alkyl esters of unsaturated aliphatic monocarboxylic acids such as methyl acrylate, methyl methacrylate or n-butyl crotonate; primary alkyl esters of halo-aliphatic monocarboxylic acids such as methyl chloroacetate or ethyl dichloroacetate; primary alkyl esters of benzoic acid such as methyl benzoate, ethyl benzoate, n-propyl benzoate, n- and iso-butyl benzoates, n- and iso-amyl benzoates, n-hexyl benzoate, n-octyl benzoate and 2-ethylhexyl benzoate; primary alkyl esters of toluic acid such as methyl toluate, ethyl toluate, n-propyl toluate, n- and iso-butyl toluates, or 2-ethylhexyl toluate; primary alkyl esters of ethylbenzoic acid such as methyl ethylbenzoate, ethyl ethylbenzoate, n-propyl ethylbenzoate, and n- and iso-butyl ethylbenzoates; primary alkyl esters of xylenecarboxylates such as methyl 3,4-xylene-1-carboxylate, ethyl 3,5-xylene-1-carboxylate, and n-propyl 2,4-xylene-1-carboxylate; primary alkyl esters of anisic such as methyl anisate, ethyl anisate, n-propyl anisate, n-butyl anisate and iso-butyl anisate; and primary alkyl esters of naphthoic acid such as methyl naphthoate, ethyl naphthoate, n-propyl naphthoate, n-butyl naphthoate, and iso-butyl naphthoate.

Of the above primary alkyl esters of aromatic carboxylic acids, the primary alkyl esters of benzoic acid, toluic acid and primary alkyl esters of anisic acid are preferred. Methyl benzoate, ethyl benzoate, p-methyl toluate, p-ethyl toluate, o-methyl toluate, o-ethyl toluate, p-methyl anisate and p-ethyl anisate are especially preferred.

(iv) Organometallic compound of a metal of Groups I to III of the periodic table Examples are the following (1) to (3).

(1) Organoaluminum compounds expressed by the formula $R^2_m Al(OR^3)_n H_p X_q$ wherein $R^2$ and $R^3$ are an alkyl group containing preferably 1 to 8 carbon atoms, more preferably 1 to 4 carbon atoms and identical or different; X is a halogen atom such as chlorine or bromine; $m$ is $0 < m \leq 3$, $n$ is $0 \leq n < 3$, $p$ is $0 \leq p < 3$, and $q$ is $0 \leq q < 3$, and $m + n + p + q = 3$.

(2) Complex alkyl compounds formed between metals of Group I and aluminum expressed by the following formula $M^1 Al R_4^2$ wherein $M^1$ is a member selected from Li, Na and K, and $R^2$ is the same as defined above.

(3) Dialkyl compounds of metals of Group II expressed by the formula $R^2 R^3 M^2$ wherein $R^2$ and $R^3$ are the same as defined above, and $M^2$ is a member selected from Mg, Zn and Cd.

When $p = q = 0$, the organic aluminum compounds of formula (1) above are expressed by the general formula $R^2_m Al(OR^3)_{3-m}$ wherein $R^2$ and $R^3$ are the same as defined above, and $m$ is preferably 1.5 to 3. When $n = p = 0$, the organic aluminum compounds of formula (1) are expressed by the general formula $R^2_m Al X_{3-m}$ wherein $R_2$ and X are the same as defined above, and $m$ is preferably more than 0 but less than 3. When $n = q = 0$, they are expressed by the general formula $R^2_m Al H_{3-m}$ wherein $R^2$ is the same as defined above, and $m$ is at least 2 but less than 3. When $p = 0$, they are expressed by the general formula $R^2_m Al(OR^3)_n X_q$ wherein $R^2$ and $R^3$ and X are the same as defined above, and $0 < m \leq 3$, $0 \leq n < 3$, $0 \leq q < 3$, and $m + n + q = 3$.

Furthermore, compounds of formula (1) wherein $p = q = 0$ and $m = 3$ are for example, trialkyl aluminums such as triethyl aluminum, or tributylaluminum or combinations of these. Preferred trialkylaluminums are triethyl aluminum and tributylaluminum. When $p = q = 0$ and $1.5 \leq m < 3$, examples of the aluminum compounds of formula (1) are dialkylaluminum alkoxides such as diethylaluminum ethoxide or dibutyl aluminum butoxide, alkylaluminum sesquialkoxides such as ethylaluminum sesquiethoxide or butylaluminum sesquibutoxide, and partially alkoxy-substituted alkylaluminums having an average composition expressed, for example, by $R_{2.5}^2 Al(OR^3)_{0.5}$. Compounds of formula (1) wherein $n = p = 0$ are partially halogenated alkylaluminums, for example, dialkylaluminum halogenides ($m = 2$) such as diethylaluminum chloride, dibutyl aluminum chloride or diethylaluminum bromide, alkylaluminum sesquihalogenides ($m = 1.5$) such as ethylaluminum sesquichloride, butylaluminum sesquichloride or ethylaluminum sesquibromide, and alkylaluminum dihalogenides such as ethylaluminum dichloride, propylaluminum dichloride or butylaluminum dibromide. Examples of compounds of formula (1) wherein $n = q = 0$ are partially hydrogenated alkylaluminums for example, dialkylaluminum hydrides ($m = 2$) such as diethylaluminum hydride or dibutylaluminum hydride, and alkylaluminum dihydrides ($m = 1$) such as ethylaluminum dihydride or propylaluminum dihydride. Examples of compounds of formula (1) wherein $p = 0$ are partially alkoxy-substituted and halogenated alkylaluminums such as ethylaluminum ethoxychloride, butylaluminum butoxychloride or ethylaluminumethoxy bromide.

Examples of the complex alkyl compounds and the dialkyl compounds mentioned in (2) and (3) above include lithium bis tetraethyl alanate, sodium bis tetraethyl alanate, potassium bis tetraethyl alanate, diethyl magnesium, di-n-propyl zinc, di-n-butyl zinc, di-ethyl zinc, di-n-isopropyl zinc, di-n-butyl zinc, di-ethyl zinc, di-n-propyl cadmium, and di-n-butyl cadmium.

(2) Titanium compounds

Examples of preferred titanium compounds are those expressed by the formula $$Ti(OR^1)_lX_{4-l}$$

wherein X is a halogen atom such as chlorine or bromine, $R^1$ is an alkyl group, preferably containing 1 to 8 carbon atoms, and l is an integer of 0 to 4.

Chlorinated compounds of titanium are preferred, and the use of titanium tetrachloride is especially recommended.

In the process of this invention, a catalyst composed of the solid titanium catalyst component (a) prepared in the manner mentioned above and the organometallic compound of a metal of Groups I to III of the periodic table (b) is used. Examples of the organometallic compound (b) are the same as those mentioned hereinabove with regard to the preparation of the solid titanium catalyst component (a).

Examples of preferred organometallic compounds (b) are organoaluminum compounds of the formula $$R_m^2 Al(OR^3)_{3-m}$$

wherein $R^2$, $R^3$ and m are the same as defined hereinabove. Specific examples include trialkylaluminums, dialkyl aluminum alkoxides, and alkylaluminum sesquialkoxides. Organoaluminums expressed by an average composition $R^2_{2.5}Al(OR^3)_{0.5}$ can also be used.

The process of this invention makes it possible to prepare polymers or copolymers of olefins containing at least 3 carbon atoms with high stereoregularity and in high yields and also with good reproducibility of quality and yield. For example, the polymerization of α-olefins containing at least 3 carbon atoms, the copolymerization of two or more of these α-olefins, and the copolymerization of these olefins with ethylene and/or diolefins can be performed by the process of this invention. In the case of copolymerization of ethylene with such an α-olefin, the proportions of the comonomers are such as to form a non-rubbery copolymer. Usually, the process of this invention is utilized for the preparation of copolymers consisting of α-olefins containing at least 3 carbon atoms as a main unit and not more than 30 mol%, preferably not more than 15 mole% of ethylene.

Examples of suitable α-olefins containing at least 3 carbon atoms are those containing 3 to 3 carbon atoms, such as propylene, 1-butene, 4-methyl-1-pentene, or 3-methyl-1-butene. Examples of the diolefins are conjugated dienes such as butadiene, and non-conjugated dienes such as dicyclopentadiene, ethylidene norbornene and 1,5-hexadiene.

The polymerization reaction in accordance with this invention can be carried out in the presence or absence of a liquid inert solvent. It can be carried out in the liquid phase in the presence of a liquid olefin monomer, and also in the gaseous phase, for example, in a fluidized catalyst bed. The polymerization temperature may be those which have heretofore been used for the polymerization of α-olefins using Ziegler catalysts, for example, 20° C. to 200° C., preferably 50° to 180° C. The polymerization pressure is from atmospheric pressure to 50 Kg/cm², preferably 2 to 30 Kg/cm².

The reaction operation of the polymerization of olefins using the catalyst of this invention may be the same as that used in the polymerization of olefins with conventional Ziegler catalysts. In other words, the reaction is carried out in the substantial absence of oxygen and moisture. When an inert solvent such as hexane, heptane or kerosene is used, the catalyst and the olefin and if desired, the diolefin are charged into the solvent, and the polymerization is performed. The suitable concentration of the catalyst is such that the solid titanium catalyst component (a) is used in an amount, calculated as titanium atom, of preferably 0.0001 to 1.0 millimol/liter of the liquid phase, more preferably 0.001 to 0.5 millimol/liter of the liquid phase. The suitable amount of the organic metal compound (b) is preferably 0.1 to 50 millimols/liter of the liquid phase, calculated as metallic atom. When the reaction is carried out in the gaseous phase, the solid titanium catalyst component (a) is used in an amount of preferably 0.001 to 1.0 millimole/liter of vapor phase, more preferably 0.001 to 0.5 millimole/liter of vapor phase, calculated as titanium atom. The organometallic catalyst component (b) is preferably used in an amount of 0.1 to 50 millimole/liter of vapor phase calculated as metallic atoms.

The ratio of the components (a) and (b) is such that the ratio of the metallic atom to the titanium atom is 1/1 to 1000/1, preferably 1/1 to 100/1.

In the polymerization of olefins, the molecular weight of the product can be controlled to some extent by changing the polymerization conditions such as the polymerization temperature or the molar ratio of the catalyst. But the addition of hydrogen to the polymerization system is most effective. When the polymerization is carried out in the presence of hydrogen in order to adjust the molecular weight, there is a tendency toward the increased formation of a non-crystalline polymer.

The following Examples and Comparative Examples illustrate the present invention more specifically.

EXAMPLE 1

Preparation of catalyst component (a)

Commercially available anhydrous magnesium chloride (0.1 mol) was suspended in 0.3 liter of kerosene. At room temperature, 0.4 mol of ethanol and 0.1 mol of ethyl benzoate were added, and the mixture was stirred for 1 hour. Then, 0.3 mol of diethylaluminum chloride was added dropwise at room temperature, and the mixture was stirred for 1 hour. The solid portion of the resulting suspension of the reaction product was separated, and washed thoroughly with kerosene, and in the absence of a free organometallic compound of a metal of Groups I to III to the periodic table, suspended in 0.3 liter of kerosene containing 30 ml. of titanium tetrachloride. The reaction was performed at 80° C for 2 hours. After the reaction, the supernatant liquid was removed by decantation. The resulting solid was fully washed with fresh kerosene. The resulting solid titanium catalyst component contained 42.3 mg of titanium and 582 mg of chlorine, both as atoms, per gram thereof.

Polymerization

An autoclave with an available volume of 2 liters was charged with 0.75 liter of kerosene, 0.375 millimol of triethylaluminum and 0.0375 millimol, calculated as titanium atom, of the catalyst component (a) prepared in the foregoing paragraph, and the mixture was heated to 70° C. Propylene was polymerized while charging it so that the total pressure was maintained at 7 Kg/cm$^2$. The solid component was collected by filtration, and washed with hexane, followed by drying to afford 425.6 g of polypropylene as a white powder.

The residue of the polymer after extraction with boiling n-heptane was 96.2%, and the polymer had an apparent density of 0.32 g/ml.

On the other hand, the liquid phase was concentrated to form 4.0 g of a solvent-soluble polymer.

The average specific polymerization activity of this catalyst was 545 PP-g/Ti-mM,hr.atm.

For comparison, the following seven catalyst components (a) were prepared in the same way as in Example 1 except that:

(1) the use of ethanol was omitted (Comparative Example 1);
(2) the use of ethyl benzoate was omitted (Comparative Example 2);
(3) the use of diethylaluminum chloride was omitted (comparative Example 3);
(4) activated MgCl$_2$ obtained by ball-milling was used, and the use of ethanol was omitted (Comparative Example 4);
(5) after the formation of the titanium catalyst component, the separation of the solid component was omitted (Comparative Example 5);
(6) the reaction with titanium tetrachloride was performed in the presence of free diethylaluminum chloride added (Comparative Example 6);
(7) after reaction with diethylaluminum chloride, the solid component was not separated, but the product was reacted with titanium tetrachloride, and at the end of the reaction, the solid component was not separated.

Using each of these catalyst components (a), propylene was polymerized in the same way as in Example 1.

The results obtained are shown in Table 1.

Table 1

| | Catalyst component (a) | | | | | Results of the polymerization | | | | |
|---|---|---|---|---|---|---|---|---|---|---|
| | Raw materials | | | | | Yield | | Characteristics | | Average specific |
| | | | Diethyl | | | | | Extraction | | polymerization |
| | | Ethyl | aluminum | Amount supported | | Powdery | Soluble | residue | Apparent | activity |
| | Ethanol | benzoate | chloride | Ti | Cl | polymer | polymer | of powder | density | (g-PP/Ti.mM. |
| Runs | (moles) | (moles) | (moles) | (mg/g) | (mg/g) | (g) | (g)* | (%)** | (g/ml) | hr.atm) |
| Ex. 1 | 0.4 | 0.1 | 0.3 | 42.3 | 582 | 425.6 | 4.0 | 96.2 | 0.32 | 545 |
| Com.Ex. 1 | — | 0.1 | 0.3 | 5.0 | 745 | 103.3 | 77.8 | 75.4 | 0.10 | 230 |
| Com.Ex. 2 | 0.4 | — | 0.3 | 62 | 515 | 271.7 | 100.4 | 73.9 | 0.15 | 473 |
| Com.Ex. 3 | 0.05 | 0.1 | — | 25 | 605 | 90.5 | 73.3 | 72.4 | 0.12 | 208 |
| Com.Ex. 4 | — | 0.1 | 0.3 | 3.2 | 830 | 161.9 | 9.6 | 93.2 | 0.31 | 218 |
| Com.Ex. 5 | 0.4 | 0.1 | 0.3 | 42.0 | 580 | trace | — | — | — | — |
| Com.Ex. 6 | 0.4 | 0.1 | 0.3 | 270 | 610 | trace | — | — | — | — |
| Com.Ex. 7 | 0.4 | 0.1 | 0.3 | 153 | 430 | trace | — | — | — | — |

*The polymer dissolved in the reaction solvent, and obtained after removal of the solvent.
**Residue of the powdery polymer after extraction with boiling n-heptane.
(The above footnotes will apply to all the examples appearing hereinafter.)

EXAMPLES 2 to 7

Catalyst components (a) were prepared in the same way as in Example 1 except that the combination of the alcohol, ester and organometallic compound was varied. Using each of the catalyst components (a) in an amount of 0.05 mM/l calculated as titanium atom and each of the organoaluminum compounds shown in Table 2, propylene was polymerized under the same conditions as in Example 1.

The results are shown in Table 2.

Table 2

| | Catalyst component (a) | | | | | Results of the polymerization | | | | |
|---|---|---|---|---|---|---|---|---|---|---|
| | Raw Materials | | | | | | | Characteristic | | Average specific |
| | | | Organic | | | Yield | | Extraction re- | | Polymerization |
| | | | Metal | Amount supported | | Powdery | Soluble | sidue of | Apparent | Activity |
| Ex. | Alcohol | Ester | compound | Ti | Cl | polymer | polymer | powder | density | (g-PP/Ti. |
| No. | (moles) | (moles) | (moles) | (mg/g) | (mg/g) | (g) | (g) | (%) | (g/ml) | mM . hr . atm) |
| 2 | MeOH (0.4) | Ethyl benzoate (0.1) | AlEt$_2$Cl (0.3) | 37.6 | 591 | 411.1 | 8.9 | 94.3 | 0.311 | 533 |
| 3 | i-PrOH (0.4) | " | " | 43.5 | 571 | 406.5 | 8.6 | 96.5 | 0.301 | 527 |
| 4 | n-BuOH (0.4) | " | " | 41.5 | 586 | 409.5 | 9.1 | 96.4 | 0.319 | 532 |
| 5 | EtOH (0.6) | Ethyl benzoate (0.2) | AlEt$_3$ (0.4) | 45.6 | 562 | 421.6 | 5.3 | 96.3 | 0.327 | 542 |
| 6 | EtOH (0.5) | Methyl benzoate (0.10) | AlEt$_2$Cl (0.4) | 41.3 | 585 | 406.5 | 8.5 | 97.1 | 0.311 | 527 |
| 7 | " | ⬡—COO-n-Bu (0.05) | " | 42.1 | 584 | 405.6 | 9.1 | 95.3 | 0.306 | 527 |
| 8 | " | Ethyl p-toluate | " | 49.5 | 560 | 400.6 | 14.4 | 95.4 | 0.301 | 527 |

Table 2-continued

| | Catalyst component (a) | | | | | Results of the polymerization | | | | |
| | Raw Materials | | Organic | | | Yield | | Characteristic | | Average specific |
| | | | Metal | Amount supported | | Powdery | Soluble | Extraction residue of | Apparent | Polymerization Activity |
| Ex. No. | Alcohol (moles) | Ester (moles) | compound (moles) | Ti (mg/g) | Cl (mg/g) | polymer (g) | polymer (g) | powder (%) | density (g/ml) | (g-PP/Ti . mM . hr . atm) |
| --- | --- | --- | --- | --- | --- | --- | --- | --- | --- | --- |
| | | (0.15) | | | | | | | | |

Abbreviations:
MeOH: methanol, EtOH: ethanol, i-PrOH: i-propanol, n-BuOH: n-butanol

EXAMPLE 9

Preparation of the catalyst component (a)

Commercially available anhydrous magnesium chloride (0.1 mol) was suspended in 0.3 liter of kerosene, and at room temperature, 0.3 mol of ethanol was added. The mixture was stirred for 1 hour. Then, 0.2 mol of diethylaluminum chloride was added dropwise at room temperature, and the mixture was stirred for one hour. Then, 0.2 mol of ethyl benzoate was added, and the temperature was raised to 70° C. After stirring the mixture for one hour, the solid was separated and collected. The solid was then washed with fresh kerosene. Then, 30 ml. of titanium tetrachloride was added, and in the absence of a free organometallic compound of a metal of Groups I to III of the periodic table, the mixture was heated to 100° C. and stirred for 2 hours. After the reaction, the solid was separated and collected by decantation, and fully washed with fresh kerosene. The solid titanium catalyst component formed as a result of the reaction contained 43.5 mg of titanium and 569 mg of chlorine, calculated as atom, per gram thereof.

Polymerization

Propylene was polymerized under the same conditions as in Example 1 except that 0.0375 millimol of the catalyst component (a) was used together with 0.375 millimol of triisobutyl aluminum instead of the triethylaluminum. 419.5 g of a white powdery polymer and 4.8 g of a solvent-soluble polymer were obtained. The residue of the powdery polymer after extraction with boiling n-heptane was 96.4%, and its apparent density was 0.32 g/ml. The average specific polymerization activity of the catalyst was 539 PP-g/Ti.mM.hr.atm.

What we claim is:

1. A process for preparing a highly crystalline olefin polymer or copolymer, which comprises polymerizing or copolymerizing an olefin containing at least 3 carbon atoms in the presence of a catalyst comprising (a) a solid titanium catalyst component obtained by reacting a solid magnesium component (1) with a liquid or solid titanium compound (2) of the formula $$Ti(OR^1)_l X_{4-l}$$

wherein X is a halogen atom, $R^1$ is an alkyl group containing 1 to 8 carbon atoms and $l$ is an integer of 0 to 4, in the absence of a free organometallic compound of a metal of Groups I to III of the periodic table, the reaction between the solid magnesium component (1) and titanium compound (2) being carried out in the suspended state by suspending the solid magnesium component in the liquid titanium compound or in a solution of the liquid or solid titanium compound in an inert solvent and separating the solid component of the resulting reaction product, said solid magnesium component being obtained by separating a solid from a suspension of a reaction product derived from (i) a magnesium dihalide, (ii) an alcohol, (iii) an organic acid ester selected from the group consisting of primary alkyl esters of aliphatic monocarboxylic acids, alkyl esters of alicyclic carboxylic acids and primary alkyl esters of aromatic monocarboxylic acids and (iv) an organometallic compound of a metal of Groups I to III of the periodic table, and (b) an organometallic compound of a metal Groups I to III of the periodic table.

2. The process of claim 1 wherein the organoaluminum compound (b) is expressed by the following formula $$R^2_m Al(OR^3)_{3-m}$$

wherein $R^2$ and $R^3$ are the same or different, and represent an alkyl group containing 1 to 8 carbon atoms, and $m$ is $0 < m \leq 3$.

3. The process of claim 1 wherein the polymerization or copolymerization is carried out in the liquid phase, wherein the amount of the solid titanium catalyst component (a), calculated as titanium atom, is 0.0001 to 0.1 millimol/liter of liquid phase and the amount of the organometallic compound (b), calculated as metal atom, is 0.1 to 50 millimol/liter of liquid phase.

4. The process of claim 3 wherein the ratio of the titanium catalyst component (a) to the organometallic compound (b), in terms of metal atom/titanium atom ratio, is 1/1 to 1000/1.

5. The process of claim 1 wherein said solid magnesium component (1) is the solid four-component reaction product derived from (i) a magnesium dihalide selected from the group consisting of magnesium dichloride, magnesium dibromide and magnesium diiodide, (ii) an alcohol selected from the group consisting of aliphatic alcohols containing 1 to 8 carbon atoms and aromatic alcohols containing 7 to 15 carbon atoms, (iii) an organic acid ester selected from the group consisting of esters of saturated or unsaturated aliphatic monocarboxylic acids containing 1 to 8 carbon atoms with saturated or unsaturated aliphatic primary alcohols containing 1 to 8 carbon atoms and esters of aromatic monocarboxylic acids containing 7 to 11 carbon atoms with saturated or unsaturated aliphatic primary alcohols containing 1 to 4 carbon atoms, and (iv) an organoaluminum compound of the formula $$R^2_m Al(OR^3)_n H_p X_q$$

wherein R² and R³ are identical or different and represent an alkyl group containing 1 to 8 carbon atoms, X represents a halogen atom, $m$ is $0 < m \leq 3$, $n$ is $0 < n \leq 3$, $p$ is $0 < p \leq 3$ and $q$ is $0 < q \leq 3$, and $m + n + p + q = 3$.

6. The process of claim 5 in which the magnesium dihalide (i) is magnesium dichloride, the alcohol (ii) is selected from the group consisting of methanol, ethanol, n-propanol, n-butanol, i-pentanol, 2-ethylhexanol, benzyl alcohol and phenetyl alcohol, the organic acid ester (iii) is selected from the group consisting of methyl formate, ethyl acetate, n-amyl acetate, 2-ethylhexyl acetate, n-butyl formate, ethyl butyrate, n-propyl valerate, benzyl acetate, phenethyl acetate, methyl methacrylate, n-butyl crotonate, methyl chloroacetate, ethyl dichloroacetate, methyl benzoate, ethyl benzoate, n-propyl benzoate, n-butyl benzoate, iso-butyl benzoate, n-amyl benzoate, iso-amyl benzoate, n-hexyl benzoate, n-octyl benzoate, 2-ethylhexyl benzoate, methyl toluate, ethyl toluate, n-propyl toluate, n-butyl toluate, iso-butyl toluate, 2-ethylhexyl toluate, methyl ethylbenzoate, ethyl ethylbenzoate, n-propyl ethylbenzoate, n-butyl ethylbenzoate, iso-butyl ethylbenzoate, methyl 3,4-xylene-1-carboxylate, ethyl 3,5-xylene-1-carboxylate, n-propyl-2,4-xylene-1-carboxylate, methyl anisate, ethyl anisate, n-propyl anisate, n-butyl anisate, iso-butyl anisate, methyl naphthoate, ethyl naphthoate, n-propyl naphthoate, n-butyl naphthoate and iso-butyl naphthoate, and the organoaluminum compound (iv) is selected from the group consisting of triethyl aluminum, tributyl aluminum, diethyl aluminum ethoxide, dibutyl aluminum butoxide, ethyl aluminum sesquiethoxide, butyl aluminum sesquibutoxide, partially alkoxy-substituted alkyl aluminums having an average composition expressed by the formula $$R_{2.5}^2Al(OR^3)_{0.5}$$

wherein R² and R³ have the above given definitions, diethyl aluminum chloride, dibutyl aluminum chloride, diethyl aluminum bromide, ethyl aluminum sesquichloride, butyl aluminum sesquichloride, ethyl aluminum sesquibromide, ethyl aluminum dichloride, propyl aluminum dichloride, butyl aluminum dibromide, diethyl aluminum hydride, dibutyl aluminum hydride, ethyl aluminum dihydride, propyl aluminum dihydride, ethyl aluminum ethoxychloride, butyl aluminum butoxychloride and ethyl aluminum ethoxybromide.

7. The process of claim 5 in which the magnesium dihalide (i) is magnesium dichloride and the titanium compound (2) is titanium tetrachloride.

8. The process of claim 1 wherein said olefin containing at least 3 carbon atoms is a member selected from the group consisting of α-olefins containing 3 to 8 carbon atoms, mixtures of these with each other, mixtures of these α-olefins with dienes, and mixtures of these α-olefins with not more than 30 mole% of ethylene.

9. The process of claim 1 wherein said magnesium dihalide (i) is selected from the group consisting of magnesium dichloride, magnesium dibromide and magnesium diiodide and said organometallic compound of a metal of Groups I to III of the periodic table (iv) is selected from the group consisting of organoaluminum compounds of the formula $$R^2_mAl(OR^3)_m H_p X_q$$

wherein R² and R³ are identical or different, and represent an alkyl group containing 1 to 8 carbon atoms, X represents a halogen atom, $m$ is $0 < m \leq 3$, $n$ is $0 < n \leq 3$, $p$ is $0 < p \leq 3$, and $q$ is $0 < q \leq 3$, and $m + n + p + q = 3$, complex alkyl compounds formed between metals of Groups I of the periodic table and aluminum expressed by the following formula $$M^1AlR^2_4$$

wherein M¹ is a member selected from the group consisting of lithium, sodium and potassium, and R² is the same as defined above, and compounds of formula $$R^2R^3M^2$$

wherein R² and R³ are the same as defined above, and M² is a member selected from the group consisting of Mg, Zn and Cd.

10. The process of claim 1 wherein the polymerization or copolymerization is carried out in the vapor phase, wherein titanium catalyst component (a), calculated as titanium atoms, is 0.001 to 1.0 millimol/liter of vapor phase and the amount of the organometallic compound (b), calculated as metal atom, is 0.001 to 0.5 millimol/liter of vapor phase.

11. The process of claim 10 wherein the ratio of the titanium catalyst component (a) to the organometallic compound (b) in terms of metal atom/titanium atom ratio is 1/1 to 100/1.

12. The process of claim 10 wherein the ratio of the titanium catalyst component (a) to the organometallic compound (b), in terms of metal atom/titanium atom ratio, is 1/1 to 1000/1.

13. The process of claim 1 in which the molar ratio of (i) magnesium dihalide: (ii) alcohol: (iii) organic acid ester: (iv) organometallic compound: (2) titanium compound is respectively 1:20-0.1:20-0.005:20-0.1:at least 0.01.

14. The process of claim 1 in which the molar ratio of (i) magnesium dihalide: (ii) alcohol: (iii) organic acid ester: (iv) organometallic compound: titanium compound is 1:6-0.1:3-0.1:6-0.2:100-0.1.

15. A catalyst for polymerization or copolymerization of olefins containing at least 3 carbon atoms, comprising (a) a solid titanium catalyst component obtained by reacting a solid magnesium component (1) with a liquid or solid titanium compound (2) of the formula $$Ti(OR^1)_l X_{4-l}$$

wherein X is a halogen atom, R¹ is an alkyl group containing 1 to 8 carbon atoms and l is an integer of 0 to 4, in the absence of a free organometallic compound of a metal of Groups I to III of the periodic table, the reaction between the solid magnesium component (1) and titanium compound (2) being carried out in the suspended state by suspending the solid magnesium component in the liquid titanium compound or in a solution of the liquid or solid titanium compound in an inert solvent and separating the solid component of the resulting reaction product, said solid magnesium component being obtained by separating a solid from a suspension of a reaction product derived from (i) a magnesium dihalide, (ii) an alcohol, (iii) an organic acid ester selected from the group consisting of primary alkyl esters of aliphatic monocarboxylic acids, alkyl esters of alicyclic carboxylic acids and primary alkyl esters of aromatic monocarboxylic acids and (iv) an organometallic compound of a metal of Groups I to III of the periodic table, and (b) an organometallic compound of a metal of Groups I to III of the periodic table.

16. The catalyst of claim 15 wherein said magnesium dihalide (i) is selected from the group consisting of magnesium dichloride, magnesium dibromide and magnesium diiodide and said organometallic compound of a metal of Groups I to III of the periodic table (iv) is selected from the group consisting of organoaluminum compounds of the formula $$R^2{}_m Al(OR^3)_n H_p X_q$$

wherein $R^2$ and $R^3$ are identical or different, and represent an alkyl group containing 1 to 8 carbon atoms, X represents a halogen atom, $m$ is $0 < m \leq 3$, $n$ is $0 < n \leq 3$, $p$ is $0 < p \leq 3$ and $q$ is $0 < q \leq 3$, and $m + n + p + q = 3$,
complex alkyl compounds formed between metals of Groups I of the periodic table and aluminum expressed by the following formula $$M^1 Al R^2{}_4$$

wherein $M^1$ is a member selected from the group consisting of lithium, sodium and potassium, and $R^2$ is the same as defined above, and
compounds of formula $$R^2 R^3 M^2$$

wherein $R^2$ and $R^3$ are the same as defined above, and $M^2$ is a member selected from the group consisting of Mg, Zn and Cd.

17. The catalyst of claim 15 wherein the organoaluminum compound (b) is expressed by the following formula $$R^2{}_m Al(OR^3)_{3-m}$$

wherein $R^2$ and $R^3$ are the same or different, and represent an alkyl group containing 1 to 8 carbon atoms, and $m$ is $0 < m \leq 3$.

18. The catalyst of claim 15 wherein the ratio of the titanium catalyst component (a) to the organometallic compound (b), in terms of metal atom titanium atom ratio, is 1/1 to 1000/1.

19. The catalyst of claim 15 wherein the solid magnesium component (1) is the solid reaction product derived from
(i) a magnesium dihalide selected from the group consisting of magnesium dichloride, magnesium dibromide and magnesium diiodide,
(ii) an alcohol selected from the group consisting of aliphatic alcohols containing 1 to 8 carbon atoms and aromatic alcohols containing 7 to 15 carbon atoms,
(iii) an organic acid ester selected from the group consisting of esters of saturated or unsaturated aliphatic monocarboxylic acids containing 1 to 8 carbon atoms with saturated or unsaturated aliphatic primary alcohols containing 1 to 8 carbon atoms and esters of aromatic monocarboxylic acids containing 7 to 11 carbon atoms with saturated or unsaturated aliphatic primary alcohols containing 1 to 4 carbon atoms, and
(iv) an organoaluminum compound of the formula $$R^2{}_m Al(OR^3)_n H_p X_q$$

p1 wherein $R^2$ and $R^3$ are identical or different and represent an alkyl group containing 1 to 8 carbon atoms, X represents a halogen atom, $m$ is $0 < m \leq 3$, $n$ is $0 < n \leq 3$, $p$ is $0 < p \leq 3$ and $q$ is $0 < q \leq 3$, and $m + n + p + q = 3$.

20. The catalyst of claim 19 in which the magnesium dihalide (i) is magnesium dichloride, the alcohol (ii) is selected from the group consisting of methanol, ethanol, n-propanol, n-butanol, i-pentanol, 2-ethylhexanol, benzyl alcohol and phenetyl alcohol, the organic acid ester (iii) is selected from the group consisting of methyl formate, ethyl acetate, n-amyl acetate, 2-ethylhexyl acetate, n-butyl formate, ethyl butyrate, n-propyl valerate, benzyl acetate, phenethyl acetate, methyl methacrylate, n-butyl crotonate, methyl chloroacetate, ethyl dichloroacetate, methyl benzoate, ethyl benzoate, n-propyl benzoate, n-butyl benzoate, iso-butyl benzoate, n-amyl benzoate, iso-amyl benzoate, n-hexyl benzoate, n-octyl benzoate, 2-ethylhexyl benzoate, methyl toluate, ethyl toluate, n-propyl toluate, n-butyl toluate, iso-butyl toluate, 2-ethylhexyl toluate, methyl ethylbenzoate, ethyl ethylbenzoate, n-propyl ethylbenzoate, n-butyl ethylbenzoate, iso-butyl ethylbenzoate, methyl 3,4-xylene-1-carboxylate, ethyl 3,5-xylene-1-carboxylate, n-propyl-2,4-xylene-1-carboxylate, methyl anisate, ethyl anisate, n-propyl anisate, n-butyl anisate, iso-butyl anisate, methyl naphthoate, ethyl naphthoate, n-propyl naphthoate, n-butyl naphthoate and iso-butyl naphthoate, and the organoaluminum compound (iv) is selected from the group consisting of triethyl aluminum, tributyl aluminum, diethyl aluminum ethoxide, dibutyl aluminum butoxide, ethyl aluminum sesquiethoxide, butyl aluminum sesquibutoxide, partially alkoxy-substituted alkyl aluminums having an average composition expressed by the formula $$R^2{}_{2.5} Al(OR^3)_{0.5}$$

wherein $R^2$ and $R^3$ have the above given definitions, diethyl aluminum chloride, dibutyl aluminum chloride, diethyl aluminum bromide, ethyl aluminum sesquichloride, butyl aluminum sesquichloride, ethyl aluminum sesquibromide, ethyl aluminum dichloride, propyl aluminum dichloride, butyl aluminum dibromide, diethyl aluminum hydrode, dibutyl aluminum hydride, ethyl aluminum dihydride, propyl aluminum dihydride, ethyl aluminum ethoxychloride, butyl aluminum butoxychloride and ethyl aluminum ethoxybromide.

21. The catalyst of claim 19 wherein the ratio of the titanium catalyst component (a) to the organometallic compound (b) in terms of metal atom/titanium atom ratio is 1/1 to 100/1.

22. The catalyst of claim 15 in which the molar ratio of (i) magnesium dihalide: (ii) alcohol: (iii) organic acid ester: (iv) organometallic compound: (2) titanium compound is respectively 1:20-0.1:20-0.005:20-0.1:at least 0.01.

23. The catalyst of claim 15 in which the molar ratio of (i) magnesium dihalide: (ii) alcohol: (iii) organic acid ester: (iv) organometallic compound: (2) titanium compound is respectively 1:6-0.1-3-0.1:6-0.2-100-0.1.

24. The catalyst of claim 15 in which the magnesium dihalide (i) is magnesium dichloride and the titanium compound (2) is titanium tetrachloride.

25. The catalyst of claim 15 in which the solid magnesium component (1) is obtained as the reaction product between (i) magnesium dichloride, (ii) ethanol, (iii) ethyl benzoate and (iv) diethyl aluminum chloride, the titanium compound (2) is titanium tetrachloride and the organometallic compound (b) is triethyl aluminum.

* * * * *

UNITED STATES PATENT OFFICE
CERTIFICATE OF CORRECTION

Patent No. 4,076,924          Dated February 28, 1978

Inventor(s) Toyota, et al.

It is certified that error appears in the above-identified patent and that said Letters Patent are hereby corrected as shown below:

Claim 1, line 11, after "and", delete "1", insert -- $\ell$ --.

Claim 6, line 31, delete "$R_{2.5}^2 Al(OR^3)_{0.5}$", insert --$R^2_{2.5} Al(OR^3)_{0.5}$--.

Claim 15, line 10, after "and", delete "1", insert -- $\ell$ --.

Claim 18, line 3, delete "atomtitanium", insert --atom/titanium--

Claim 23, line 4, delete "1:6-0.1-3-0.1:6-0.2-100-0.1.", insert --1:6-0.1:3-0.1:6-0.2:100-0.1.--.

Signed and Sealed this

Twentieth Day of June 1978

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

Patent No. 4,076,924      Dated February 28, 1978

Inventor(s) Toyota, et al.

It is certified that error appears in the above-identified patent and that said Letters Patent are hereby corrected as shown below:

Claim 14, line 3, after "compound:" and before "titanium", insert --(2)--.

Claim 14, line 4, after "is", insert --respectively--.

Signed and Sealed this

Eighth Day of August 1978

[SEAL]

Attest:

RUTH C. MASON
Attesting Officer

DONALD W. BANNER
Commissioner of Patents and Trademarks